(12) United States Patent
Gebert et al.

(10) Patent No.: US 12,532,398 B2
(45) Date of Patent: Jan. 20, 2026

(54) POWER SUPPLY CIRCUIT FOR AN X-RAY PRODUCTION SYSTEM

(71) Applicant: Siemens Healthineers AG, Forchheim (DE)

(72) Inventors: Bernhard Gebert, Hagenau (DE); Michael Wimmer, Weisendorf (DE); Christian Holland-Nell, Pinzberg (DE)

(73) Assignee: Siemens Healthineers AG, Forchheim (DE)

( * ) Notice: Subject to any disclaimer, the term of this patent is extended or adjusted under 35 U.S.C. 154(b) by 441 days.

(21) Appl. No.: 17/973,109

(22) Filed: Oct. 25, 2022

(65) Prior Publication Data

US 2023/0137033 A1    May 4, 2023

(30) Foreign Application Priority Data

Oct. 28, 2021 (EP) ..................................... 21205325

(51) Int. Cl.
*H05G 1/12* (2006.01)
(52) U.S. Cl.
CPC ..................... *H05G 1/12* (2013.01)
(58) Field of Classification Search
CPC ........ H02J 3/00125; H02J 5/00; H02M 7/062; A61B 6/56
See application file for complete search history.

(56) References Cited

U.S. PATENT DOCUMENTS

| | | | | |
|---|---|---|---|---|
| 4,995,069 A | * | 2/1991 | Tanaka | H05G 1/10 378/101 |
| 6,169,782 B1 | * | 1/2001 | Zetterlund | H05G 1/12 378/102 |
| 2009/0034686 A1 | * | 2/2009 | Soto Santos | H05G 1/32 378/112 |
| 2010/0189225 A1 | * | 7/2010 | Ernest | H05G 1/58 378/103 |
| 2010/0220837 A1 | * | 9/2010 | Bressel | A61B 6/56 378/103 |
| 2010/0254515 A1 | * | 10/2010 | Iijima | H02M 1/32 378/112 |
| 2012/0027161 A1 | * | 2/2012 | Abenaim | A61B 6/4233 378/103 |

(Continued)

FOREIGN PATENT DOCUMENTS

| | | |
|---|---|---|
| CN | 201393172 Y | 1/2010 |
| CN | 106130190 A | 11/2016 |

(Continued)

*Primary Examiner* — David P Porta
*Assistant Examiner* — Soorena Kefayati
(74) *Attorney, Agent, or Firm* — Harness, Dickey & Pierce, P.L.C.

(57) ABSTRACT

A power supply circuit for an x-ray production system, which has an inverter circuit with an output for connecting the inverter circuit with an x-ray source of the x-ray production system, includes a rectifier circuit including an input to connect the rectifier circuit with a power supply network, the rectifier circuit further including an output to connect to an input of the inverter circuit; and a backup circuit including a plurality of electrical energy storage cells, the plurality of electrical energy storage cells being connectable in series between the input of the inverter circuit and the output of the rectifier circuit.

20 Claims, 2 Drawing Sheets

(56) References Cited

U.S. PATENT DOCUMENTS

| | | | | |
|---|---|---|---|---|
| 2012/0170717 | A1* | 7/2012 | Rosevear | H05G 1/12 378/103 |
| 2012/0326504 | A1* | 12/2012 | Ballantine | H02J 3/0073 307/65 |
| 2014/0056411 | A1* | 2/2014 | Roos | H05G 1/12 378/109 |
| 2014/0064455 | A1 | 3/2014 | Park et al. | |
| 2015/0085969 | A1* | 3/2015 | Mekonnen | H05G 1/10 378/4 |
| 2017/0027537 | A1* | 2/2017 | Zhang | A61B 6/4405 |
| 2018/0042096 | A1* | 2/2018 | Kim | H02J 50/10 |
| 2018/0199421 | A1* | 7/2018 | Kim | H02H 7/18 |
| 2018/0317870 | A1* | 11/2018 | Fehre | A61B 6/4441 |
| 2019/0058404 | A1* | 2/2019 | Gadenne | H05G 1/32 |
| 2019/0165668 | A1* | 5/2019 | Sakabe | H02M 1/08 |
| 2019/0181857 | A1* | 6/2019 | Caiafa | H03K 17/691 |
| 2020/0008288 | A1* | 1/2020 | Park | A61B 6/4405 |
| 2020/0068694 | A1* | 2/2020 | Ishiyama | H02M 5/458 |
| 2020/0084869 | A1* | 3/2020 | Jin | H05G 1/12 |
| 2020/0329548 | A1* | 10/2020 | Ishiyama | H02M 7/219 |
| 2021/0227675 | A1* | 7/2021 | Murakami | H05G 1/46 |
| 2022/0394837 | A1* | 12/2022 | Mirzaei | H02J 9/062 |

FOREIGN PATENT DOCUMENTS

| | | |
|---|---|---|
| CN | 111463881 A | 7/2020 |
| CN | 111556639 A | 8/2020 |
| CN | 212784875 U | 3/2021 |
| DE | 4204115 A1 | 8/1993 |
| EP | 3799243 A1 | 3/2021 |
| KR | 101370598 B1 | 3/2014 |

\* cited by examiner

POWER SUPPLY CIRCUIT FOR AN X-RAY PRODUCTION SYSTEM

CROSS-REFERENCE TO RELATED APPLICATION(S)

The present application claims priority under 35 U.S.C. § 119 to European Patent Application No. 21205325.0, filed Oct. 28, 2021, the entire contents of which are incorporated herein by reference.

FIELD

One or more example embodiments of the present invention relates to a power supply circuit for an x-ray production system and an x-ray production system having such a power supply circuit.

STATE OF THE ART

X-ray production systems, for instance for computed tomography systems, can be operated in a three-phase manner, for instance with a target voltage of several hundred volts and a relatively large tolerance range. One example would be for instance a target voltage of 400 V with a tolerance range of +10%/−20%. On account of their briefly high power consumption, such x-ray production systems make very high demands on the infrastructure, for instance safety devices, cable cross-sections etc. of the building in which they are installed. The internal mains resistance at the connection point may in particular only be so high that the voltage dip during an x-ray recording does not result in an undervoltage for other connected devices.

For adjustment to the large operating voltage range, an adjustment transformer could be used on the one hand. High additional costs develop as a result. Alternatively, an x-ray production system could be used with a wide-range input. In this regard a significant part of the possible generator power must largely be kept unused for possible operating voltages. With x-ray production systems having two x-ray emitters, a second mains connection must be guided through the entire service chain, including rectification, slip ring, mains filter and building connection, so that accordingly the demand on the on-site installation increases drastically.

SUMMARY

One or more example embodiments of the present invention reduces the power consumption from a power supply network via an x-ray production system.

This is achieved by the subject matter of the independent claim.

One or more example embodiments of the present invention is based on the idea of connecting a backup circuit in series between the rectifier circuit and the inverter circuit for an x-ray production system, which for its part has a plurality of energy storage cells which are connected in series with one another. A power supply circuit is therefore provided for an x-ray production system, which, with the given output power of the x-ray production system, reduces the maximum power consumption from the power supply network or, in other words, with the given maximum power consumption from the power supply network, increases the output power of the x-ray production system.

According to one or more example embodiments of the present invention, a power supply circuit for an x-ray production system, which has an inverter circuit with an output for connecting the inverter circuit with an x-ray source of the x-ray production system, includes a rectifier circuit including an input to connect the rectifier circuit with a power supply network, the rectifier circuit further including an output to connect to an input of the inverter circuit; and a backup circuit including a plurality of electrical energy storage cells, the plurality of electrical energy storage cells being connectable in series between the input of the inverter circuit and the output of the rectifier circuit.

According to one or more example embodiments of the present invention, the power supply circuit includes an intermediate direct current (DC) circuit between the input of the inverter circuit and the backup circuit.

According to one or more example embodiments of the present invention, the intermediate DC circuit includes a buffer capacitor.

According to one or more example embodiments of the present invention, the backup circuit includes a plurality of additional electrical energy storage cells connected in series; and a switching element configured to connect the plurality of additional electrical energy storage cells between the input of the inverter circuit and the output of the rectifier circuit.

According to one or more example embodiments of the present invention, the power supply circuit includes a control circuit configured to determine an input voltage of the inverter circuit; and control the switching element as a function of an input voltage of the inverter circuit to connect the plurality of further energy storage cells between the input of the inverter circuit and the output of the rectifier circuit.

According to one or more example embodiments of the present invention, the control circuit is configured to control the switching element to connect the plurality of additional electrical energy storage cells between the input of the inverter circuit and the output of the rectifier circuit when the input voltage of the inverter circuit does not reach a threshold value.

According to one or more example embodiments of the present invention, the power supply circuit includes a charging device configured to charge the plurality of electrical energy storage cells.

According to one or more example embodiments of the present invention, the plurality of electrical energy storage cells are double layer capacitors.

According to one or more example embodiments of the present invention, the plurality of electrical energy storage cells are accumulator cells.

According to one or more example embodiments of the present invention, the plurality of electrical energy storage cells includes 30 to 70 energy storage cells.

According to one or more example embodiments of the present invention, the x-ray production system comprises a power supply circuit according to an example embodiment; the inverter circuit; and the x-ray source.

According to one or more example embodiments of the present invention, the x-ray production system comprises an additional x-ray source connected in parallel to the x-ray source.

According to one or more example embodiments of the present invention, the x-ray production system is a computed tomography system.

BRIEF DESCRIPTION OF THE DRAWINGS

Example embodiments of the present invention are explained in more detail below with reference to specific exemplary embodiments and associated schematic drawings. In the figures, identical or functionally identical elements can be provided with the same reference numbers. The description of identical or functionally identical elements may not necessarily be repeated with respect to different figures.

In the figures.

DETAILED DESCRIPTION

Figure 1:
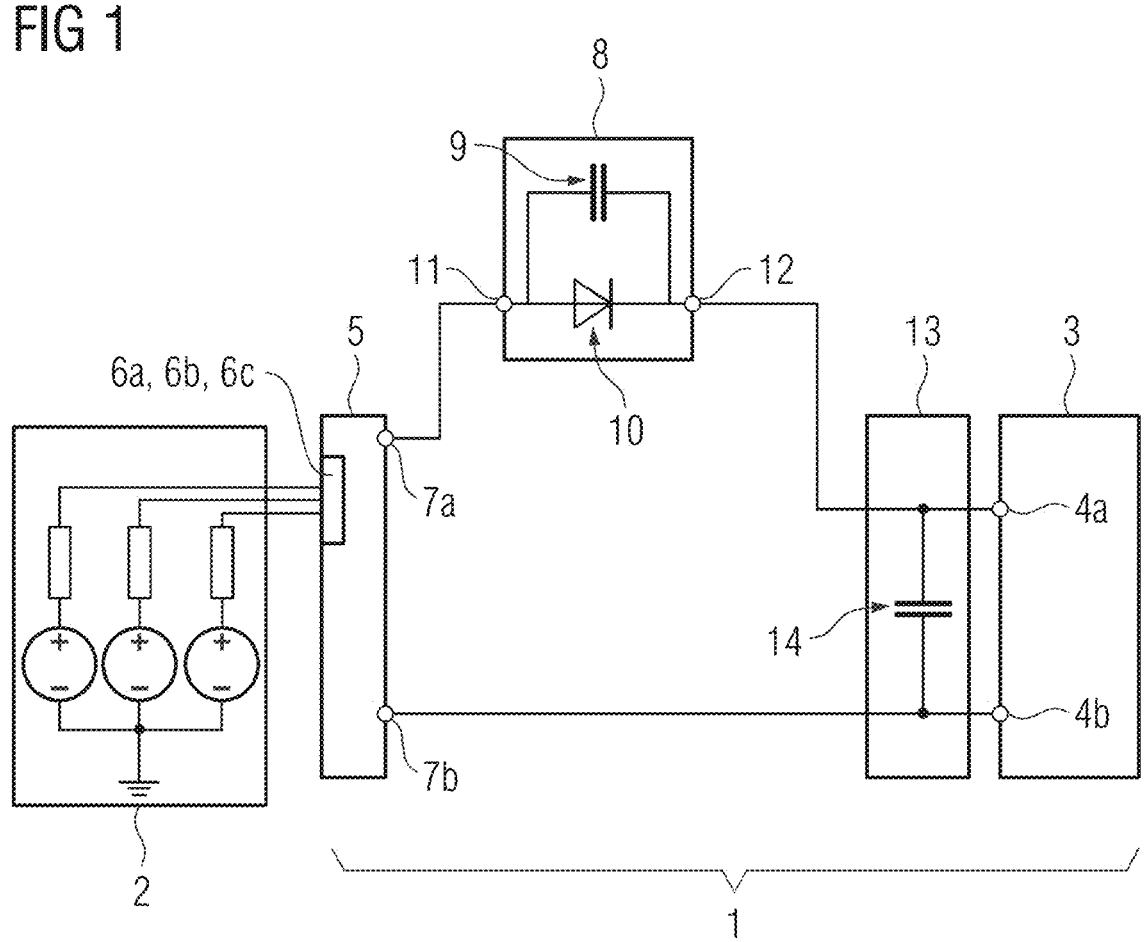
FIG. 1 shows a schematic block diagram of an exemplary embodiment of a power supply circuit for an x-ray production system according to the invention.

According to one or more example embodiments of the present invention, a power supply circuit is specified for an x-ray production system. The x-ray production system has an inverter circuit which has an output for connecting the inverter circuit with an x-ray source of the x-ray emitter production system. The power supply circuit has a rectifier circuit which has an input for connecting the rectifier circuit with a power supply network, wherein an output of the rectifier circuit can be connected to an input of the inverter circuit. The power supply circuit moreover has a backup circuit which has a plurality of electrical energy storage cells which are connected in series with one another. The plurality of energy storage cells can be connected here in series between the input of the inverter circuit and the output of the rectifier circuit.

In various embodiments of the power supply circuit, this also contains the inverter circuit. The output of the rectifier circuit is then connected in particular with the input of the inverter circuit and the plurality of energy storage cells is in particular connected in series between the input of the inverter circuit and the output of the rectifier circuit.

In different embodiments, the backup memory can have two or more strands, connected in parallel with one another, of in each case energy storage cells connected in series. It is therefore not only a pure series connection that is possible.

Unless specified otherwise, here and below an electrical connection can be a direct electrical connection or an indirect electrical connection.

The power supply network which is not part of the power supply circuit or the x-ray production system is embodied in particular as an AC network or AC voltage network. The alternating voltage or the alternating current at the input of the rectifier circuit is converted by this into a direct voltage or a direct current at the output of the rectifier circuit. The output of the rectifier circuit and the input of the inverter circuit between which the plurality of energy storage cells is connected in series correspond here to terminals of the same polarity.

The power supply network can be in particular a multi-phase, for instance three-phase, power supply network. Accordingly, the rectifier circuit is then embodied as a multiphase, for instance three-phase, rectifier circuit. In other words, the rectifier circuit then converts the three phases of the alternating voltage or the alternating current provided by the power supply network into a shared direct voltage or a shared direct current at the output of the rectifier circuit, in particular between the output and a reference potential terminal, for instance a ground terminal.

The inverter circuit can then in turn convert the thus produced direct voltage into an alternating voltage or an alternating current in order to supply the x-ray source, in particular in other words a single-phase alternating current or a single-phase alternating voltage, in order to supply the x-ray source.

The plurality of energy storage cells can be charged to a predetermined voltage before using the x-ray production system, in other words in the case of a computed tomography system before scanning, for instance. The energy storage cells are arranged in series between the rectifier circuit and the inverter circuit so that in addition to the voltage provided from the energy supply network by way of the rectifier circuit, they make a further contribution to the voltage supply of the inverter circuit and thus the x-ray source. The voltage of the energy storage cells can be selected for instance so that the entire voltage, which is applied to the inverter circuit, corresponds to a maximum permissible voltage.

After starting the x-ray production, the mains voltage provided by the power supply network can break down as a result of the high power consumption of the x-ray production system. Via the backup circuit and the energy stored in the energy storage cells of the plurality of energy storage cells, the required voltage can thus be provided for operation of the x-ray production system.

The maximum power consumption of the x-ray production system from the power supply network therefore reduces to the extent to which the input voltage for the inverter circuit is increased by the backup circuit. Alternatively or in addition to reducing the power consumption of the x-ray production system, the power supply circuit can be used by the backup circuit also to increase the output power of the x-ray production system with a given mains connection.

In accordance with one or more example embodiments of the present invention, a supply voltage which is largely independent of the power supply network can therefore be made available to the x-ray production system. An x-ray production system which is designed for a wide range output can achieve significantly more power via a correspondingly adjusted winding ratio of the high voltage transformer. The x-ray production system is therefore also significantly less dependent on the mains impedance of the power supply network at the connection point.

According to at least one embodiment, the power supply circuit has an intermediate DC circuit which can be or is connected between the input of the inverter circuit and the backup circuit.

The intermediate DC circuit can accordingly stabilize the direct voltage provided to the inverter circuit. For instance, the intermediate DC circuit can have a buffer capacitor or a number of buffer capacitors connected in series and/or in parallel with one another, which is or are connected in parallel in particular with the input of the inverter circuit and the output of the rectifier circuit.

Alternatively, the intermediate DC circuit can also be considered to be part of the inverter circuit.

According to at least one embodiment, the backup circuit has a plurality of further electrical energy storage cells connected in series. Moreover, the backup circuit has a switching element which contains a transistor, for instance, and which is arranged and designed optionally to establish and interrupt a series connection of the plurality of further energy storage cells between the input of the inverter circuit and the output of the rectifier circuit.

In other words, the plurality of further energy storage cells is connected in series between the input of the inverter circuit and the output of the rectifier circuit, wherein this series connection can optionally be interrupted and established by the switching element.

In other words again, the plurality of further energy storage cells is connected in series between the input of the inverter circuit and the output of the rectifier circuit, when the switching element is in a closed state, in other words an electrically conducting state. In particular, the energy storage cells of the plurality of energy storage cells and the further energy storage cells of the plurality of further energy storage cells are then all connected in series with one another and between the output of the rectifier circuit and the input of the inverter circuit. If the switching element is in an opened state, in other words an electrically non-conducting or substantially non-conducting state, the further energy storage cells are no longer connected in series between the rectifier circuit and the inverter circuit. The energy storage cells of the plurality of energy storage cells are however also connected in series with one another when the switching element is opened and in series between the output of the rectifier circuit and the input of the inverter circuit.

In this way, a fixed part of an energy buffer is therefore formed in the backup circuit by the plurality of energy storage cells and a variable part of the energy buffer which can therefore be switched on or off is formed by the plurality of further energy storage cells.

In this way, it is possible to respond dynamically or flexibly to mains voltage fluctuations or fluctuations in the power consumption of the x-ray production system, by the further energy storage cells being switched on or off accordingly.

The further energy storage cells can also be charged accordingly as described with respect to the energy storage cells before starting the operation of the x-ray production system.

In particular, the plurality of further energy storage cells can only be connected some time after starting the scan and a corresponding breakdown of the supply voltage of the inverter circuit or the intermediate circuit voltage below a predetermined threshold value. After connection, the further energy storage cells in systems with a sufficiently good internal mains resistance can remain permanently connected. Otherwise, the further energy storage cells can also be disconnected again by way of the switching element, if they are no longer required.

According to at least one embodiment, the power supply circuit, in particular the backup circuit, has a control circuit which is designed to determine an input voltage of the inverter circuit, in particular an intermediate circuit voltage of the intermediate DC circuit. The control circuit is coupled to the switching element in order to control this as a function of the input voltage of the inverter circuit. The control circuit can control the switching element in order optionally to establish or interrupt the series connection of the plurality of further energy storage cells between the input of the inverter circuit and the output of the inverter circuit.

If the power supply circuit has the intermediate DC circuit and in particular the buffer capacitor or the buffer capacitors connected in parallel thereto, the input voltage of the inverter circuit corresponds to the intermediate circuit voltage of the intermediate DC circuit, in other words the voltage across the buffer capacitor or the buffer capacitors.

According to at least one embodiment, the control circuit is designed to control the switching element in order to establish the series connection of the plurality of further energy storage cells between the input of the inverter circuit and the output of the rectifier circuit if, particularly precisely when, the input voltage of the inverter circuit does not reach a predetermined threshold value.

The fact that the input voltage does not reach the threshold value may be understood to mean in particular that the value of the input voltage is initially larger than the threshold value and subsequently smaller than the threshold value.

The series connection can be established in this way in particular if after operation of the x-ray production system has started, the threshold value is firstly not met by the input voltage.

According to at least one embodiment, the power supply circuit, for instance the backup circuit, has a charging device which can be or is connected to the plurality of energy storage cells in order to charge the plurality of energy storage cells.

In corresponding embodiments, the charging device can also be connected or connectible with the plurality of further energy storage cells in order also to charge the same. Alternatively, a further charging device can be provided in order to charge the plurality of further energy storage cells.

The energy storage cells of the plurality of energy storage cells and, in corresponding embodiments, the further energy storage cells of the plurality of further energy storage cells can be embodied in different embodiments as capacitors, in particular as double layer capacitors.

Via the series connection of the energy storage cells and possibly the further energy storage cells with one another and with respect to the rectifier circuit and the inverter circuit, particularly when double layer capacitors are used, a very high power density can be provided over a very small installation space. Alternatively to the capacitors, accumulator cells, in particular lithium ion accumulator cells, can also be used as energy storage cells or further energy storage cells of the backup circuit.

Depending on the specific design of the x-ray production system and on the requisite power consumption, the plurality of energy storage cells can consist for instance of 30 to 70, for instance 40 to 60, energy storage cells. The plurality of further energy storage cells can possibly contain fewer energy storage cells, for instance consisting of 10 to 50, in particular 20 to 40, further energy storage cells.

According to a one or more example embodiments of the present invention, an x-ray production system is also specified, which has an inventive power supply circuit and an x-ray source which is connected to an output of the inverter circuit in order to supply electrical energy.

According to at least one embodiment of the x-ray production system, this has a further x-ray source which is connected in parallel with the x-ray source.

In particular, with such two or multi-beam x-ray production systems, one or more example embodiments of the present invention has a particularly advantageous effect since here the demands on the power supply network are raised correspondingly significantly.

According to one or more example embodiments of the present invention, a computed tomography system is specified which has an inventive x-ray production system. Alternatively, the x-ray production system can be designed as a computed tomography system.

Further features of one or more example embodiments of the present invention may be derived from the claims, the figures and the description of the figures. The features and feature combinations mentioned above in the description and the features and feature combinations mentioned below in the description of the figures and/or shown in the figures can be encompassed by one or more example embodiments of the present invention not only in the specified combination in each case, but also in other combinations. In particular, the invention also encompasses embodiments and feature combinations which do not have all the features of a claim as originally formulated. Moreover, the invention encompasses embodiments and feature combinations that extend beyond or deviate from the feature combinations described in the back references in the claims.

FIG. 1 shows a block diagram of an inventive power supply circuit 1 for an x-ray production system and schematically a power supply network 2 which is embodied for instance as a three-phase alternating current network.

The individual phases of the power supply network 2 are connected to corresponding input connections 6a, 6b, 6c of a rectifier circuit 5 of the power supply circuit 1. The power supply circuit 1 moreover has an inverter circuit 3 and an intermediate DC circuit 13 and a backup circuit 8.

The rectifier circuit 5 can convert the alternating voltage provided by the power supply network 2 into a direct voltage and provide this to two corresponding outputs 7a, 7b of the rectifier circuit 5. The first output 7a of the rectifier circuit 5 is connected to an input 11 of the backup circuit 8 and an output 12 of the backup circuit 8 is connected to a first input 4a of the inverter circuit 3. The second output 7b of the rectifier circuit 5 is connected to a second input 4b of the inverter circuit 3.

The intermediate DC circuit 13 has a buffer capacitor 14, which is connected between the inputs 4a, 4b and thus also between the output 12 of the backup circuit 8 and the second output 7b of the rectifier circuit 5.

The backup circuit 8 contains a plurality of energy storage cells 9 connected in series with one another, which are shown in FIG. 1 schematically by the graphical symbol of an individual capacitor.

The plurality of energy storage cells 9 is connected in series between the input 11 and the output 12 of the backup circuit 8. Accordingly, the backup circuit 8 and also the plurality of energy storage cells 9 are connected in series between the output 7a of the rectifier circuit 5 and the input 4a of the inverter circuit 3 or the intermediate DC circuit 13.

Moreover, the backup circuit 8 can contain a diode 10 connected in parallel with the plurality of energy storage cells 9. A cathode of the diode 10 is connected here for instance with the output 12 of the backup circuit 8 and an anode of the diode 10 is connected with the input 11 of the backup circuit 8.

The power supply circuit 1 moreover has a charging device (not shown in FIG. 1) via which the plurality of energy storage cells 9 can be charged before the start of the operation.

Figure 2:
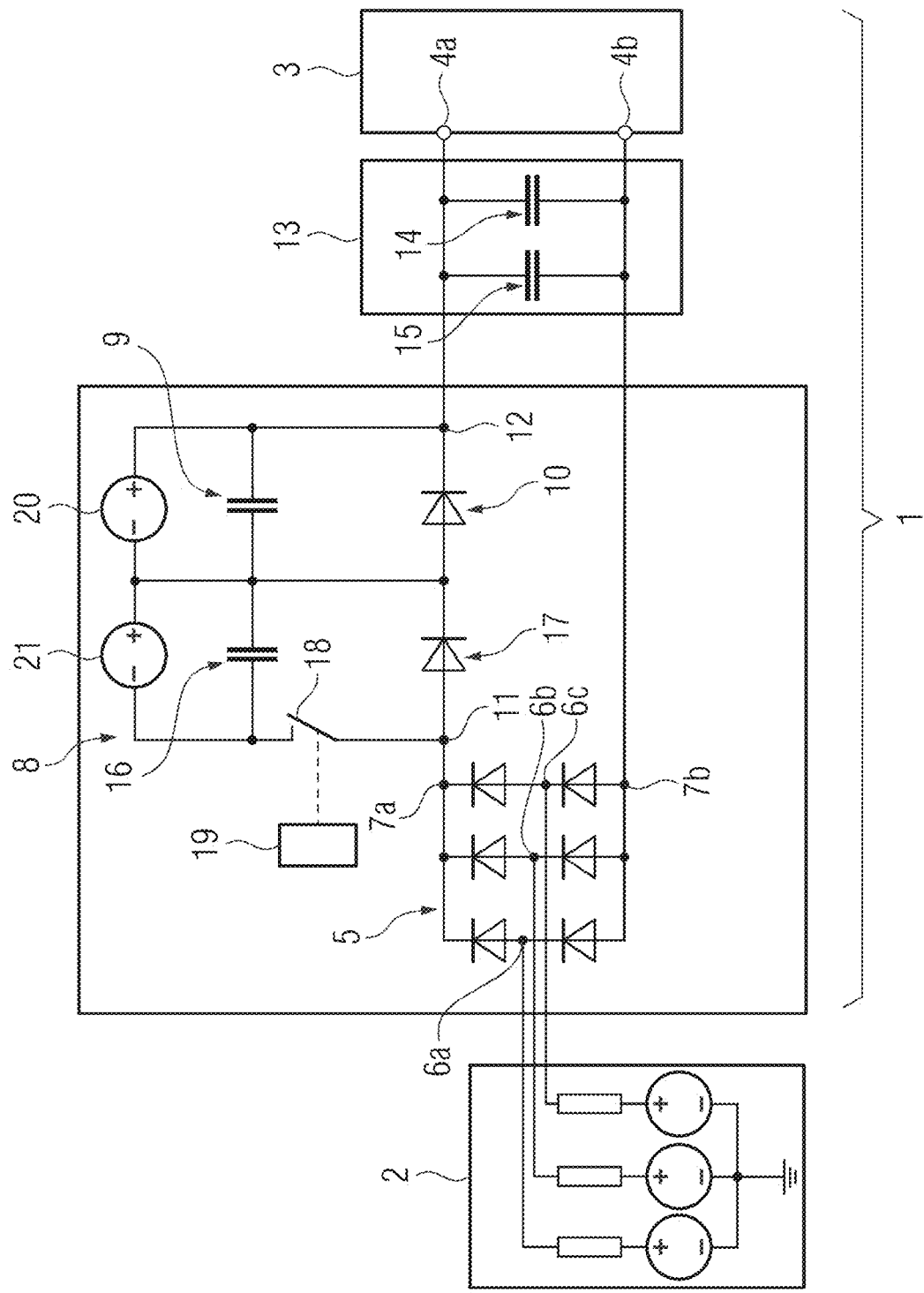
FIG. 2 shows a schematic block diagram of a further exemplary embodiment of a power supply circuit for an x-ray production system according to the invention.

FIG. 2 shows a schematic representation of a further exemplary embodiment of the power supply circuit 1 according to the invention, wherein the embodiment in FIG. 2 is based in particular on the embodiment in FIG. 1.

In the example in FIG. 2, the intermediate DC circuit 13 contains a further buffer capacitor 15, which is connected in parallel with the buffer capacitor 14. Moreover, the backup circuit 8 contains a plurality of further energy storage cells 16, which are connected in series with one another and for simplification purposes are likewise shown by the graphical symbol of an individual capacitor. The plurality of further energy storage cells 16 is connected on one side to the plurality of energy storage cells 9 and on the other side in a switchable manner to the input 11 of the backup circuit 8. To this end the backup circuit 8 has in particular a switching element 18.

If the switching element 18 is therefore in a closed state, the energy storage cells 9 and the further energy storage cells 16 are therefore all connected in series with one another and also in series between the input 11 and the output 12 of the backup circuit 8. If the switching element 18 is in an open state, the further energy storage cells 16 are coupled out of the series connection and the energy storage cells 9 are connected as before in series between the input 11 and the output 12 of the backup circuit 8.

In order to control the switching element 18, the power supply circuit 1 contains a control unit 19, which can also be referred to as control circuit. The control unit 19 can switch the switching element 18 in particular from the open into the closed state or vice versa. In particular, the control unit 19 can determine an intermediate circuit voltage of the intermediate DC circuit 13, in other words a voltage which drops across the buffer capacitors 14, 15 or between the inputs 4a, 4b of the alternating voltage circuit 3. The control unit 19 can compare the intermediate circuit voltage with a predetermined threshold value and, when the switching element 18 is initially opened, close this if the intermediate circuit voltage drops below the predetermined threshold value.

FIG. 2 also shows the charging device 20. Furthermore, the power supply circuit 1 in the example in FIG. 2 has a further charging device 21, in order to charge the further energy storage cells 16 accordingly. In alternative embodiments, the charging devices 20, 21 can also be replaced by a shared charging device for charging the energy storage cells 9 and the further energy storage cells 16.

Finally, the backup circuit 8 can have a further diode 17, which is connected in parallel to the further energy storage cells 16 and in series with the diode 10.

Further details of one or more example embodiments of the present invention are explained below on the basis of FIG. 1 and FIG. 2 and corresponding dimensioning and design examples. These are in no way restrictive to the invention. The specific design can be different depending on the requirements given.

The x-ray production systems 1 in FIG. 1 and FIG. 2 are three-phase, for instance operated with a voltage of 400 V +10%/−20% and on account of their briefly high power consumption, place very high demands on the infrastructure, for instance safety devices, cable cross-sections, and so forth, of the building in which they are installed. The internal mains resistance of the power supply network 2 at the connection point may only be so high that the voltage dip during an x-ray recording does not result in a low voltage for simultaneously connected devices.

This not only involves high demands on the building installation but can also limit the possible scan power per connection point. If, with a computed tomography system, for instance a rotational speed of the scan unit, also referred to as gantry, is to be increased, for instance according to an increase in the rotational frequency of 4 Hz to 5 Hz, the scan power must be increased for a constant dose per image from for instance 120 kW to 150 kW. Therefore, with the smallest permissible mains voltage, a mains impedance of 60 mΩ would be required, which would be technically extremely demanding.

The use of a shared mains connection for a two emitter system or the operation of a high power computed tomography system on a weak mains connection are therefore not possible in accordance with the current prior art.

These restrictions counteract the inventive x-ray production systems 1 in FIG. 1 and FIG. 2, by the backup circuit 8 being connected between the rectifier circuit 5 and the intermediate DC circuit 13, which by the energy storage cells 9 and optionally the further energy storage cells 16, which are embodied for instance as double layer capacitors or dual layer capacitors connected in series for instance, which can be charged to a variable voltage before scanning on the basis of the charging device 16, 21. As a result, the intermediate circuit voltage can be raised to a constant value in the region of a maximum permissible intermediate circuit voltage, which can amount to 750 V for instance.

The backup circuit 8 can be installed together with the rectifier circuit 5, the intermediate DC circuit 13 and the inverter circuit 3 or can be installed separately. The resulting reduction in the power consumption is produced from the design, in particular the maximum voltage, the capacitance and the internal resistance of the energy storage cells 9, 16.

In one design example the intermediate circuit voltage should move independently of the power supply network 2 in the region of 650 V to 720 V, in order to reduce the power consumption of the x-ray production system. The available range can be divided into a voltage drop in the energy storage by discharge and a mains voltage drop according to the mains impedance.

The entire voltage of the backup circuit 8 should then be sufficient to be able to reach an intermediate circuit voltage of 720 V for instance when the mains voltage breaks down. It can therefore be designed at 220 V, for instance.

A breakdown due to the network impedance and storage impedance, as a result of transfer resistances, and so forth, can optionally be compensated for by the connectible part of the backup circuit 8 in the form of the further energy storage cells 16. These can only be switched on for instance some time after starting the scan and a breakdown of the intermediate circuit voltage below a specific value. A current consumption of 250 A denotes the effective value according to square-shaped means, and an internal mains resistance of 150 mΩ amounts to the breakdown for instance of around 90 V, the voltage of the switchable part of the energy buffer can therefore be designed to 75 V for instance. The further energy storage cells 16 can be switched on as a function of the current intermediate circuit voltage via the control unit 19 across the switching element 18. Here the switching element 18 can have a pulse-shaped current consumption and be connected in the current-less state.

The further energy storage cells 16 can remain permanently switched on in systems with sufficiently good internal mains resistance. If they are required to compensate for the mains voltage breakdown, then the energy storage cells 9 and the further energy storage cells 16 can overall be charged up to 750 V, for instance.

In corresponding embodiments, the required capacitance of the double layer capacitors is directed substantially toward the limit load curve of the x-ray source or the x-ray sources. When two 90 kW x-ray sources are used on an individual mains connection designed for a 120 kW system with a conventional course of the limit load curve, double layer capacitors with a capacitance of 1800 F are sufficient, for instance.

The number of energy storage cells 9 can be designed for instance for 45-55 parts, the number of optional further energy storage cells 16 for instance for 25-30 parts, wherein the individual cell voltage can be charged to 2.7 V for instance briefly before the scan. Otherwise the cell voltage can be regulated to a low value in order to extend the service life.

With the smallest possible mains voltage and smallest possible power, approximately 40% of the output power can be obtained from the backup circuit. With a maximum average power of for instance 6 kW for a two emitter system, the charging devices 20, 21 can therefore be designed for instance so that they can deliver 2.4 kW. This power is only required in the upper voltage range, an exemplary design at 250 V and 15 A therefore offers adequate reserves. Shorter time intervals could possibly result in a brief increase in the charging power to 6 kW. In standby and with the smallest scan power, the charging devices 20, 21 can also contribute to improving the power factor of the x-ray production system via a suitable control.

As described, one or more example embodiments of the present invention can be used to reduce the power consumption. The maximum power consumption reduces in particular to the extent to which the intermediate circuit voltage is increased by the backup circuit 8. With a backup voltage of 200V and an intermediate circuit voltage without storage of 450 V, the power consumption can be reduced by approx. 30%.

In addition to reducing the power consumption of an x-ray production system, the backup circuit 8 can also be used to increase the output power of the x-ray production system with a given mains connection. In conjunction with the backup circuit 8, the x-ray production system is operated with a higher intermediate circuit voltage, which results in an increase in the output power when internal currents remain unchanged. With the same input current, the possible output power is increased by approx. 44% in the afore-cited example.

In current systems the reduction in the maximum current consumption of the x-ray production system can amount to up to 40%, for instance. A 90 kW computed tomography system with two x-ray emitters and just one mains input could therefore be realized.

Moreover, the power consumption of a computed tomography system can be reduced so that for instance with a uniform mains connection power and embodiment, a 90 kW device could be replaced by a 120 kW device.

According to one or more example embodiments of the present invention, a supply voltage which is largely independent of the mains can be made available to an x-ray production system. An x-ray production system which is designed for a wide range input can achieve significantly more power via an adjusted winding ratio of the high voltage transformer. The x-ray production system is significantly less dependent on the mains impedance of the connection point.

In various embodiments, the power factor of the x-ray production system can be improved, in particular in standby, via a suitable control of the charging device.

It will be understood that, although the terms first, second, etc. may be used herein to describe various elements, components, regions, layers, and/or sections, these elements, components, regions, layers, and/or sections, should not be limited by these terms. These terms are only used to distinguish one element from another. For example, a first element could be termed a second element, and, similarly, a second element could be termed a first element, without departing from the scope of example embodiments. As used herein, the term "and/or," includes any and all combinations of one or more of the associated listed items. The phrase "at least one of" has the same meaning as "and/or".

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

Spatial and functional relationships between elements (for example, between modules) are described using various terms, including "on," "connected," "engaged," "interfaced," and "coupled." Unless explicitly described as being "direct," when a relationship between first and second elements is described in the disclosure, that relationship encompasses a direct relationship where no other intervening elements are present between the first and second elements, and also an indirect relationship where one or more intervening elements are present (either spatially or functionally) between the first and second elements. In contrast, when an element is referred to as being "directly" on, connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Also, the term "example" is intended to refer to an example or illustration.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

It is noted that some example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed above. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Specific structural and functional details disclosed herein are merely representative for purposes of describing example embodiments. The present invention may, however, be embodied in many alternate forms and should not be construed as limited to only the embodiments set forth herein.

In addition, or alternative, to that discussed above, units and/or devices according to one or more example embodiments may be implemented using hardware, software, and/or a combination thereof. For example, hardware devices may be implemented using processing circuity such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner. Portions of the example embodiments and corresponding detailed description may be presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device/hardware, that manipulates and transforms data represented as physical, electronic quantities within the computer system's registers and memories into other data similarly represented as physical quantities within the computer system memories or registers or other such information storage, transmission or display devices.

In this application, including the definitions below, the term 'module', 'interface' or the term 'controller' may be replaced with the term 'circuit.' The term 'module' may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

Even further, any of the disclosed methods may be embodied in the form of a program or software. The program or software may be stored on a non-transitory computer readable medium and is adapted to perform any one of the aforementioned methods when run on a computer device (a device including a processor). Thus, the non-transitory, tangible computer readable medium, is adapted to store information and is adapted to interact with a data processing system or computer device to execute the program of any of the above mentioned embodiments and/or to perform the method of any of the above mentioned embodiments.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as a computer processing device or processor; however, one skilled in the art will appreciate that a hardware device may include multiple processing elements or processors and multiple types of processing elements or processors. For example, a hardware device may include multiple processors or a processor and a controller. In addition, other processing configurations are possible, such as parallel processors.

The computer programs include processor-executable instructions that are stored on at least one non-transitory computer-readable medium (memory). The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc. As such, the one or more processors may be configured to execute the processor executable instructions.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

Further, at least one example embodiment relates to the non-transitory computer-readable storage medium including electronically readable control information (processor executable instructions) stored thereon, configured in such that when the storage medium is used in a controller of a device, at least one embodiment of the method may be carried out.

The computer readable medium or storage medium may be a built-in medium installed inside a computer device main body or a removable medium arranged so that it can be separated from the computer device main body. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules.

Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

The invention claimed is:

1. A power supply circuit for an x-ray production system, the x-ray production system having an inverter circuit with an output for connecting the inverter circuit with an x-ray source of the x-ray production system, and the power supply circuit comprising:
   a rectifier circuit including,
      an input configured to connect the rectifier circuit with a power supply network,
      a first output configured to connect to a first input of the inverter circuit, the output of the inverter circuit being directly connectable to the x-ray source, and
      a second output configured to connect to a backup circuit; and
   the backup circuit including a plurality of electrical energy storage cells, the plurality of electrical energy storage cells being configured to connect in series between a second input of the inverter circuit and the second output of the rectifier circuit.

2. The power supply circuit of claim 1, further comprising:
   an intermediate direct current (DC) circuit being configured to connect between the second input of the inverter circuit and an output of the backup circuit.

3. The power supply circuit of claim 1, wherein the backup circuit includes:
   a plurality of additional electrical energy storage cells connected in series; and
   a switching element configured to connect the plurality of additional electrical energy storage cells between the second input of the inverter circuit and the second output of the rectifier circuit.

4. The power supply circuit of claim 1, further comprising:
   a charging device configured to charge the plurality of electrical energy storage cells.

5. The power supply circuit of claim 1, wherein the plurality of electrical energy storage cells are double layer capacitors.

6. The power supply circuit of claim 1, wherein the plurality of electrical energy storage cells are accumulator cells.

7. The power supply circuit of claim 1, wherein the plurality of electrical energy storage cells includes 30 to 70 energy storage cells.

8. An x-ray production system comprising:
   the power supply circuit of claim 1;
   the inverter circuit; and
   the x-ray source.

9. The power supply circuit of claim 2, wherein the intermediate DC circuit includes a buffer capacitor.

10. The power supply circuit of claim 2, further comprising:
    a charging device configured to charge the plurality of electrical energy storage cells.

11. The power supply circuit of claim 2, wherein the plurality of electrical energy storage cells are double layer capacitors.

12. The power supply circuit of claim 2, wherein the plurality of electrical energy storage cells are accumulator cells.

13. The power supply circuit of claim 2, wherein the plurality of electrical energy storage cells includes 30 to 70 energy storage cells.

14. The power supply circuit of claim 9, wherein the plurality of electrical energy storage cells are double layer capacitors.

15. The power supply circuit of claim 9, wherein the plurality of electrical energy storage cells are accumulator cells.

16. The power supply circuit of claim 9, wherein the plurality of electrical energy storage cells includes 30 to 70 energy storage cells.

17. The power supply circuit of claim 3, further comprising:
    a control circuit configured to,
       determine an input voltage of the inverter circuit; and
       control the switching element as a function of the input voltage of the inverter circuit to connect the plurality of additional electrical energy storage cells between the second input of the inverter circuit and the second output of the rectifier circuit.

18. The power supply circuit of claim 17, wherein the control circuit is configured to control the switching element to connect the plurality of additional electrical energy storage cells between the second input of the inverter circuit and the second output of the rectifier circuit based on the input voltage of the inverter circuit being below a threshold value.

19. The x-ray production system of claim 8, further comprising:
    an additional x-ray source connected in parallel to the x-ray source.

20. The x-ray production system of claim 8, wherein the x-ray production system is a computed tomography system.

* * * * *